United States Patent
Ramamurthy et al.

(10) Patent No.: US 10,866,893 B2
(45) Date of Patent: Dec. 15, 2020

(54) CACHE COHERENCY ENGINE

(71) Applicant: Home Depot Product Authority, LLC, Atlanta, GA (US)

(72) Inventors: Hari Ramamurthy, Marietta, GA (US); Chandan Venkatesh, Smyrna, GA (US); Krishna Guggulotu, Smyrna, GA (US); Rageesh Thekkeyil, Cumming, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 348 days.

(21) Appl. No.: 15/877,945

(22) Filed: Jan. 23, 2018

(65) Prior Publication Data

US 2019/0227937 A1 Jul. 25, 2019

(51) Int. Cl.
| | |
|---|---|
| *G06F 17/00* | (2019.01) |
| *G06F 12/0817* | (2016.01) |
| *G06F 12/0871* | (2016.01) |
| *G06F 16/27* | (2019.01) |
| *G06F 16/28* | (2019.01) |

(Continued)

(52) U.S. Cl.
CPC ...... *G06F 12/0828* (2013.01); *G06F 12/0871* (2013.01); *G06F 16/2308* (2019.01); *G06F 16/2372* (2019.01); *G06F 16/24552* (2019.01); *G06F 16/27* (2019.01); *G06F 16/288* (2019.01); *G06F 2212/604* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 6,138,209 A | * | 10/2000 | Krolak | G06F 12/0864 711/122 |
| 6,526,480 B1 | * | 2/2003 | Naruse | G06F 9/383 711/141 |

(Continued)

FOREIGN PATENT DOCUMENTS

| | | |
|---|---|---|
| TW | 201437928 A | 10/2014 |
| WO | 0116788 A2 | 3/2001 |

OTHER PUBLICATIONS

ISA/US, International Search Report and Written Opinion issued International Application No. PCT/US19/14296, dated Apr. 19, 2019, 10 pgs.

*Primary Examiner* — Hasanul Mobin
(74) *Attorney, Agent, or Firm* — Greenberg Traurig, LLP

(57) ABSTRACT

A method for operating a database and a cache of at least a portion of the database may include receiving a plurality of read requests to read a data entity from the database and counting respective quantities of the requests serviced from the database and from the cache. The method may further include receiving a write request to alter the data entity in the database and determining whether to update the cache to reflect the alteration to the data entity in the write request according to the quantity of the requests serviced from the database and the quantity of the requests serviced from the cache. In an embodiment, the method further includes causing the cache to be updated when a ratio of the quantity of the requests serviced from the database to the quantity of the requests serviced from the cache exceeds a predetermined threshold.

18 Claims, 5 Drawing Sheets

(51) Int. Cl.
    *G06F 16/23*    (2019.01)
    *G06F 16/2455*  (2019.01)

(56) References Cited

U.S. PATENT DOCUMENTS

| | | | | |
|---|---|---|---|---|
| 6,941,338 B1* | 9/2005 | Madsen | ............... | H04L 67/2819 |
| | | | | 709/203 |
| 7,720,687 B2 | 5/2010 | Jung et al. | | |
| 7,846,014 B2 | 12/2010 | Shelton | | |
| 8,070,599 B2 | 12/2011 | Van Luchene | | |
| 8,838,882 B1* | 9/2014 | Quong | ................ | G06F 12/0802 |
| | | | | 711/103 |
| 9,002,793 B1* | 4/2015 | Ashcraft | ................ | H04L 67/02 |
| | | | | 707/636 |
| 9,229,870 B1* | 1/2016 | Kumar | ................ | G06F 12/0804 |
| 9,274,956 B1* | 3/2016 | Salyers | ............... | G06F 12/0868 |
| 9,591,096 B2* | 3/2017 | Kondo | ................ | H04L 67/2852 |
| 9,636,587 B2 | 5/2017 | Thomas et al. | | |
| 9,769,030 B1 | 9/2017 | Ramalingam et al. | | |
| 9,880,933 B1* | 1/2018 | Gupta | ................ | G06F 12/0815 |
| 10,025,718 B1* | 7/2018 | Wasiq | ..................... | G06F 11/34 |
| 2002/0178096 A1 | 11/2002 | Marshall | | |
| 2008/0046658 A1* | 2/2008 | Goodman | ........... | G06F 12/0862 |
| | | | | 711/137 |
| 2008/0320222 A1 | 12/2008 | Dhodapkar | | |
| 2009/0164518 A1 | 6/2009 | Ghafoor | | |
| 2009/0172249 A1* | 7/2009 | Matthews | ........... | G06F 12/0888 |
| | | | | 711/103 |
| 2009/0181777 A1 | 7/2009 | Christiani et al. | | |
| 2010/0031011 A1* | 2/2010 | Chen | ..................... | G06F 9/3806 |
| | | | | 712/240 |
| 2011/0258225 A1* | 10/2011 | Taylor | ................. | G06F 16/2272 |
| | | | | 707/769 |
| 2012/0283024 A1 | 11/2012 | Van Luchene | | |
| 2013/0143644 A1 | 6/2013 | Van Luchene | | |
| 2013/0246713 A1* | 9/2013 | Ahmad | ................ | G06F 12/0866 |
| | | | | 711/142 |
| 2014/0106836 A1 | 4/2014 | Short et al. | | |
| 2014/0344520 A1* | 11/2014 | Jenkins | ............... | G06F 12/0815 |
| | | | | 711/118 |
| 2015/0088805 A1* | 3/2015 | Kakarla | ............ | G06F 16/24552 |
| | | | | 707/600 |
| 2015/0095584 A1* | 4/2015 | Chockler | ........... | H04L 67/2852 |
| | | | | 711/135 |
| 2016/0085682 A1* | 3/2016 | Johnson | ............... | G06F 16/9574 |
| | | | | 707/692 |
| 2016/0110284 A1* | 4/2016 | Athalye | ............... | G06F 16/2455 |
| | | | | 711/120 |
| 2017/0017574 A1* | 1/2017 | Deng | .................... | G06F 12/0862 |
| 2017/0103024 A1* | 4/2017 | Matsuo | ............... | G06F 12/0862 |
| 2017/0132706 A1 | 5/2017 | Kariv et al. | | |
| 2017/0189811 A1 | 7/2017 | Thomas et al. | | |
| 2017/0192888 A1* | 7/2017 | Moon | ................. | G06F 13/4068 |
| 2017/0295236 A1 | 10/2017 | Kulkarni et al. | | |

* cited by examiner ic # CACHE COHERENCY ENGINE

FIELD OF THE DISCLOSURE

This disclosure is generally directed to management of a cache for a database, such as a transactional database.

BACKGROUND OF RELATED ART

Many transactional processing systems rely on a relational database. The processing load in such systems is generally a mixture of "write" operations that modify the data and "read" operations that recall the data. For high volume systems, in particular, it may be useful to separate the read operations from the write operations traffic into separate instances so that both instances can use their respective capacities efficiently. This pattern is known and is generally referred to as command query responsibility separation (CQRS).

SUMMARY

An example embodiment of a method for operating a database and a cache of at least a portion of the database may include receiving a plurality of read requests to read a data entity from the database, determining whether each of the plurality of read requests was serviced from the database or from the cache, and counting a quantity of the requests serviced from the database and a quantity of the requests serviced from the cache. The method may further include receiving a write request to alter the data entity in the database and determining whether to update the cache to reflect the alteration to the data entity in the write request according to the quantity of the requests serviced from the database and the quantity of the requests serviced from the cache. In an embodiment, the method further includes causing the cache to be updated when a ratio of the quantity of the requests serviced from the database to the quantity of the requests serviced from the cache exceeds a predetermined threshold.

An example embodiment of a system for operating a database and a cache of at least a portion of the database may include a cache management system configured to be in electronic communication with the database and with the cache, the cache management system comprising a processor and a computer-readable memory storing instructions that, when executed by the processor, cause the cache management system to receive a plurality of read requests to read a data entity from the database, determine whether each of the plurality of read requests was serviced from the database or from the cache, count a quantity of the requests serviced from the database and a quantity of the requests serviced from the cache, receive a write request to alter the data entity in the database, and determine whether to update the cache to reflect the alteration to the data entity in the write request according to the quantity of the requests serviced from the database and the quantity of the requests serviced from the cache. In an embodiment, the instructions, when executed by the processor, further cause the cache management system to cause the cache to be updated when a ratio of the quantity of the requests serviced from the database to the quantity of the requests serviced from the cache exceeds a predetermined threshold.

An example embodiment of a system for operating a database may include a cache of at least a portion of the database and a cache management system configured to be in electronic communication with the database and with the cache, the cache management system comprising a processor and a computer-readable memory storing instructions. When executed by the processor, the instructions cause the cache management system to receive a plurality of read requests to read a data entity from the database and, for each of the plurality of read requests, determine if the cache has an accurate copy of the data entity, responsive to determining that the cache has an accurate copy of the data entity, service the request from the cache, and responsive to not determining that the cache has an accurate copy of the data entity, service the request from the database. The instructions further cause the cache management system to count a quantity of the requests serviced from the database and a quantity of the requests serviced from the cache, receive a write request to alter the data entity in the database, and determine whether to update the cache to reflect the alteration to the data entity in the write request according to the quantity of the requests serviced from the database and the quantity of the requests serviced from the cache.

DETAILED DESCRIPTION

Known database cache systems may not properly use the computing resources of both the database and the cache to provide quality response times to database queries and accurate responses. Improved efficiency, response times, and response accuracy may be provided by operating a database cache according to the present disclosure. The teachings of the present disclosure may be particularly useful in database management systems using command query response separation. As described in greater detail below, a cache of at least a portion of a database may be provided. The cache may be used to service a database request when appropriate, and the database may be used to service requests for which the cache is not appropriate (e.g., because the cache does not contain up-to-date information responsive to the request), in an embodiment. The frequency and quantity of responses that are respectively serviced by the cache and by the database may be tracked, and the cache may be updated when the database has been used too frequently relative to the cache to service requests. Additionally or alternatively, the cache may be updated when a predictive algorithm indicates that the database will be used too frequently (relative to the cache) in the future. By updating the cache at appropriate times, the combined processing load of (i) servicing requests from the database and (ii) updating the cache may be reduced, thereby improving the response time of the database system to requests and improving the functionality of the database system.

Figure 1:
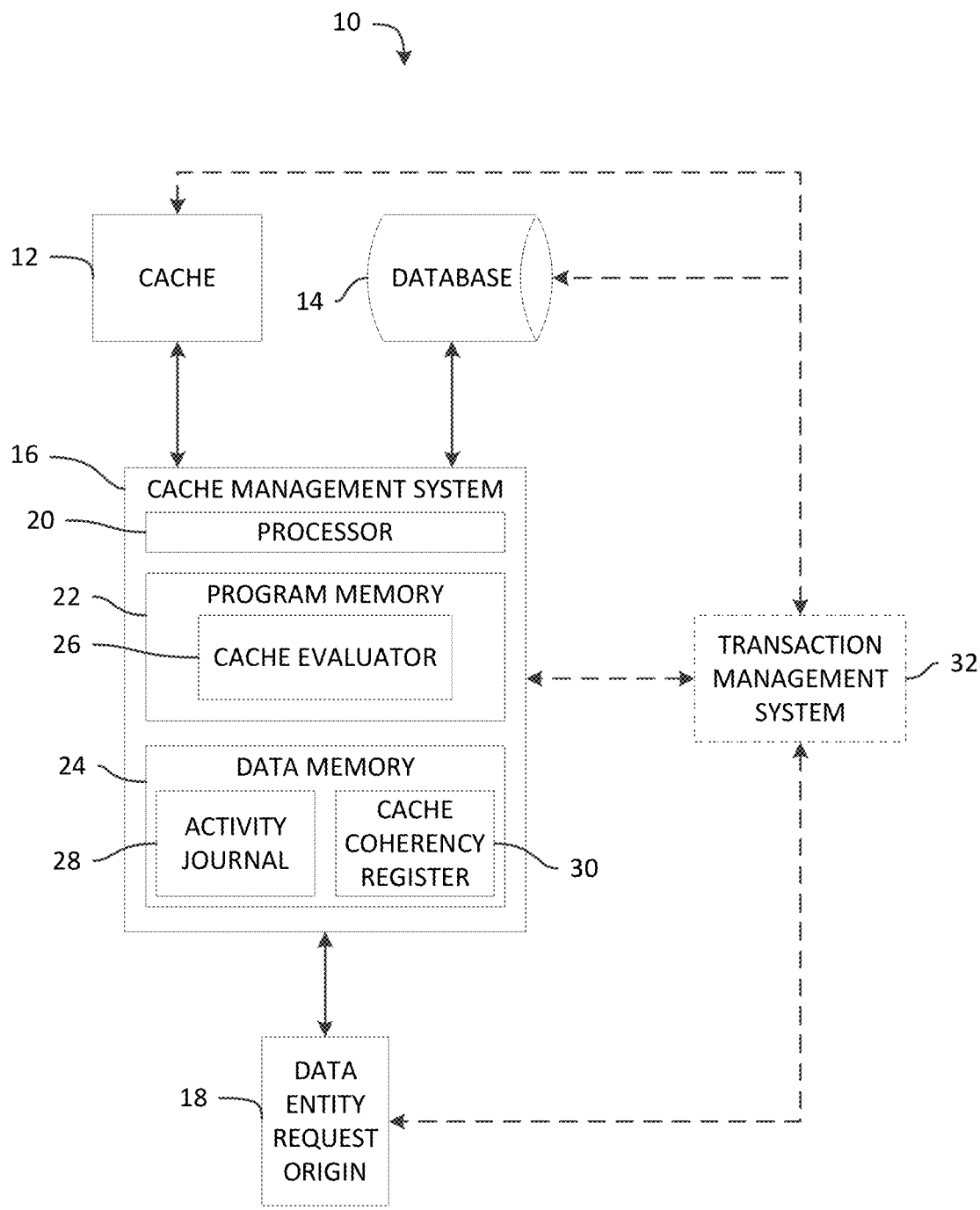
FIG. 1 is a diagrammatic view of an example system for operating a database and a supporting cache.

FIG. 1 is a diagrammatic view of an example system 10 for operating a database and supporting cache. The system 10 may include a cache 12, a database 14, a cache management system 16, and one or more data entity request origins 18.

The database 14 may be any type of electronic data storage. In embodiments, the database 14 may be a relational database. In other embodiments, the database 14 may be a non-relational database. In embodiments, the database 14 may be a no-SQL database. In an embodiment, the database 14 may store data respective of one or more products, transactions (e.g., single-item or multi-item orders or purchases), inventory, and the like for one or more retail enterprises.

The cache 12 may store redundant backup copies of one or more portions of the database 14 (e.g., one or more data entities of the database 14). The cache 12 may also be any type of electronic data storage. In some embodiments, the cache 12 may be the same type of data storage as the database 14. In other embodiments, the cache 12 may be a different type of data storage from the database 14. In embodiments, the cache 12 may be able to service read requests more rapidly than the database 14 is able to, because the cache 12 may comprise a storage type that is able to read and return data faster than the storage type of the database 14, and/or because the cache 12 stores less data than the database 14. In some embodiments, the cache may be or may include a NoSQL cache, such as a CASSANDRA cache, a cloud-based cache, or an in-memory cache, such as redis or memcache.

Each of the data entity request origins 18 may be or may include a personal computer, mobile computing device, or other computing device operated by a user. A data entity request origin 18 may transmit a request to read one or more data entities from the database 14. As discussed below, such requests may be serviced from the database or from the cache, as appropriate.

The cache management system 16 may include a processor 20, a program memory 22, and a data memory 24. The program memory 22 may store computer-executable instructions that, when executed by the processor 20, cause the cache management system 16 to perform one or more of the methods, steps, processes, etc. of this disclosure. For example, the cache management system 16 may perform one or more portions of the methods of FIG. 2, 3, or 4 when the processor 20 executes instructions stored in the program memory 22.

The program memory 22 may include instructions embodying a cache evaluator program 26 for, e.g., determining when to update one or more portions of the cache 12 so as to match current data in the database 14. Accordingly, the cache management system 16 may be in electronic communication with the cache 12 and with the database 14. In order to determine when to update one or more portions of the cache 12, the cache management system 16 may track activity related to one or more data entities stored in the database 14 (e.g., requests to read a data entity, requests to write to (e.g., alter) a data entity) and may store records of such activity in an activity journal 28 in the data memory 24 for each of the one or more data entities. For example, a record of each write to and/or read of a given data entity for a given time period may be stored in the activity journal 28. In an embodiment, for example, the cache management system 16 may be configured to store (e.g., in the activity journal 28) a record of each write to and/or read of a particular data entity since the last time that the data entity was updated in the cache 12.

The cache management system 16 may also be configured to track the quantity of read requests for one or more data entities that are serviced from the database 14, the quantity of read requests for the same one or more data entities that are serviced from the cache 12, and store such quantitative data in a cache coherency register 30 in the data memory 24. In an embodiment, the cache management system 16 may be configured to track, record, and store quantities of read requests for each of a plurality of data entities serviced from the database 14, and quantities of read requests for the plurality of data entities serviced from the cache 12. Such quantities may be stored in the cache coherency register 30, in an embodiment. Further, such quantities may be tracked, recorded, and stored for one or more separate time periods, in an embodiment. For example, respective quantities of read requests serviced from the database 14 and cache 12 may be stored for a first time period and, separately, respective quantities of read requests serviced from the database 14 and cache 12 may be stored for a second time period that is different from the first time period, and so on. A time period may be, for example, ten minutes, an hour, a day, or some other appropriate time period.

The cache management system 16 may be further configured to determine a ratio of the quantity of read requests serviced from the cache 12 to the quantity of read requests serviced from the database 14, and/or to calculate a predicted future ratio of respective quantities of read requests serviced from the cache 12 and database 14, and to store such ratio(s) in the cache coherency register 30. Such a ratio may be respective of a single data entity, in an embodiment. The cache management system 16 may be further configured to store a state of a "publish flag" in the cache coherency register 30 that indicates whether a given data entity should be updated in the cache. The cache management system 16 may calculate such ratios for one or more time periods (e.g., based on the time periods for which respective quantities of read requests from the cache 12 and database 14 are tracked, as described above). In an embodiment, the cache management system 16 may be configured to continuously calculate a "current" ratio for a current time period, as well as maintain records of ratios for previous time periods. The cache management system 16 may also continuously calculate one or more predicted ratios (e.g., based on the current ratio and/or previous ratios), in an embodiment.

Based on the current and/or predicted ratios, the cache management system 16 may determine when to update the cache 12. Based on this determination, the cache management system 16 may set the value of a "publish flag" that may indicate, for a given data entity, whether that data entity should be updated in the cache 12 to be the same as that data entity in the database 14.

In an embodiment, the cache management system 16 may also be configured to receive requests from the data entity request origins 18 and service those requests. The cache management system 16 may be configured to service a request for a data entity from the database according to the method of FIG. 3, in embodiments.

With continued reference to FIG. 1, in embodiments, the system 10 may further include a transaction management system 32 in electronic communication with the data entity request origins 18, the cache management system 16, the database 14, and/or the cache 12. The transaction management system 32 may be involved in completing a transaction with a request origin 18 (e.g., user). Of particular relevance to this disclosure, the transaction management system 32 may be disposed between the request origins 18 and the cache management system 16, the database 14, and/or the cache 12 for communication purposes, in embodiments. For example, in embodiments, the transaction management system 32 may receive read requests from the request origins 18 and may provide those requests (or data respective of those requests) to the cache management system 16 for the processing and calculations of this disclosure. Furthermore, in embodiments, the transaction management system 32 may also receive data write requests and may cause data to be changed in the database 14. The transaction management system 32 may also provide such write transactions, or data respective of such write transactions, to the cache management system 16 for the processing and calculations of this disclosure. In embodiments, the transaction management system 32 may receive read and write requests from the request origins 18, forward those requests to the cache management system 16, and the cache management system 16 may communicate with the database and cache to return the desired information to the transaction management system 32 for provision to the request origins. For purposes of this disclosure, communications between the request origins 18 and the cache management system 16 in which the transaction management system 32 serves as an intermediary are considered to be communications between the cache management system 16 and the request origins 18.

Figure 2:
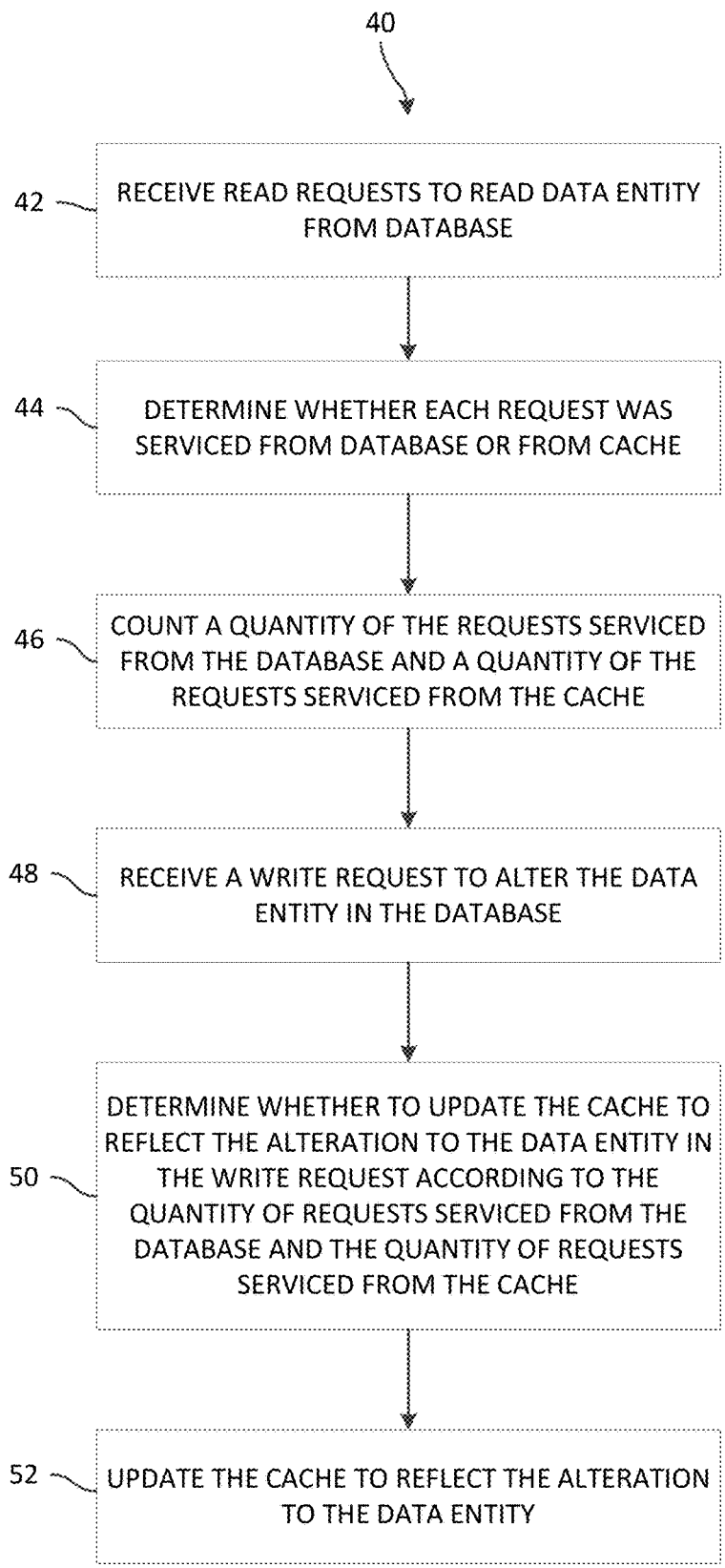
FIG. 2 is a flow chart illustrating an example method for operating a database cache.

FIG. 2 is a flow chart illustrating an example method 40 for operating a database cache. The method 40 may be performed, in whole or in part, by a cache management system in communication with a database, cache, and data request origins, such as the cache management system 16, database 14, cache 12, and request origins 18 of FIG. 1, for example. The method 40 may be performed to determine when it is appropriate to update one or more portions of a cache and to perform corresponding updates on the cache so as to improve the overall functionality (e.g., response time, database processing load, etc.) of a database system with a supporting cache.

The method 40 will be described with reference to a single data entity (e.g., a record of a transaction) stored in a database to determine when to update the cache with respect to that data entity. The steps of the method 40 may be performed in parallel with respect to multiple data entities, in embodiments, to determine when to update the cache as to each of those data entities. A cache update with respect to a given data entity may be made when it is determined appropriate for that entity, in some embodiments, or may be made in batches with other data entities to be updated, in other embodiments.

The method 40 may include a step 42 that includes receiving a plurality of read requests to read a data entity from the database. A single request may be or may include, for example, a request for the data respective of a particular transaction, such as a product order. The requests may be received directly from the origins of the requests, or may be received from the origins by way of one or more intervening computing systems. The requests may originate from a single origin, or from multiple origins. The requests may be serviced from (i.e., by reading data from) either the database or the cache, in embodiments. An example method of servicing read requests will be described in conjunction with FIG. 3.

The method 40 may further include a step 44 that includes determining whether each request was serviced from the database or from the cache. The determining step may include, in an embodiment, maintaining a record of all activity on the data entity, including all requests to read the data entity, all writes to the entity, and the manner in which all read requests to the data entity are serviced. Referring to FIG. 1, such activity may be stored in the activity journal 28 and/or the cache coherency register 30, in an embodiment. For example, in an embodiment, complete data regarding each transaction may be maintained in the activity journal 28, and simple indications of reads serviced from the database and from the cache (e.g., quantities thereof) may be stored in the cache coherency register 30.

With continued reference to FIG. 2, the method 40 may further include a step 46 that includes counting a quantity of the requests serviced from the database and a quantity of requests serviced from the cache. Referring to FIG. 1, the counting step may include maintaining a running total of the quantity of the requests serviced from the database 14 and the quantity of requests serviced from the cache 12, in an embodiment. Referring to FIG. 1, such a running total may be maintained in the data memory 24, e.g., in the cache coherency register 30. Alternatively, the counting step 46 may include reviewing records of read requests, and counting whether each request was serviced from the database or cache, at a desired point in time.

Referring again to FIG. 2, the method 40 may further include a step 48 that includes receiving a write request to alter the data entity in the database. The write request may be received from a request origin that sent one or more of the read requests received in step 42, or may be received from a separate request origin. Responsive to the write request, the database may be updated to reflect the data entity alteration indicated in the write request. As a result, the data entity stored in the database may be unsynchronized with (i.e., different from) the data entity stored in the cache.

The method 40 may further include a step 50 that includes determining whether to update the cache to reflect the alteration to the data entity in the write request according to the quantity of the requests serviced from the database and the quantity of the requests serviced from the cache. The determining step 50 may include one or more comparisons or mathematical analyses, in embodiments, as detailed further below.

In embodiments, a determination of whether to update the cache may be made based on the current read loads of the database and/or the cache (e.g., based on the relative frequency with which the database and cache service requests). If the read load of the database is higher than desired, the cache management system may determine that the cache should be updated.

In an embodiment, determining whether to update the cache may include computing a ratio of the quantity of the requests serviced from the database to the quantity of the requests serviced from the cache and comparing such a ratio to a threshold. If the ratio exceeds the threshold, thereby indicating that the database is being used to service requests more frequently than desired, it may be determined that the cache should be updated. The threshold may be set, in an embodiment, by balancing the speed gains offered by servicing read requests from the cache (instead of the database) with the computational cost associated with updating the cache.

Additionally or alternatively, a determination of whether to update the cache may be made based on predicted read loads of the database and/or cache. In embodiments, a determination of whether to update the cache may include applying a predictive algorithm to the quantity of the requests serviced from the database and the quantity of the requests serviced from the cache that calculates a likelihood that a future read request will be serviced from the database. For example, respective ratios of the quantity of the requests serviced from the database to the quantity of the requests serviced from the cache may be computed for two or more relevant historical periods, and one or more of those ratios may be used to determine whether to update the cache. In an embodiment, the predictive algorithm may be applied to two or more such ratios. In an embodiment, the mean, median, or trend of those ratios may be compared to a threshold. Such historical periods may include, for example, a sequence of time periods immediately before the current time period (where the "current" time period is the time period in which the determination is being made. Such historical periods may additionally or alternatively include specific dates that are relevant to the date of the current time period. For example, in an embodiment in which the database stores sales records and/or inventory data, a historical period may include a period of time when a similar promotion to a current promotion was available. Similarly, historical periods may include high-volume, "peak" periods, such as Black Friday, Cyber Monday, and the like, that may be used to predict a current peak period.

In embodiments in which historical ratios are considered, ratios for activity on similar data entities may be considered, rather than only activity on an exact data entity, for a predictive algorithm for that exact data entity. For example, for data entities that are sales records for sales of a specific tool, historical ratios for sales records respective of all tools may be considered. In another example, for data entities that are sales records for an item of holiday merchandise, historical ratios for sales of all holiday merchandise may be considered.

In another example in which the determination of whether to update the cache may be made based on predicted read loads of the database and/or cache, a linear regression may be applied to ratios of the quantity of the requests serviced from the database to the quantity of the requests serviced from the cache may be computed for a set of relevant historical periods, and the result of the linear regression may be compared to a threshold.

The method 40 may further include a step 52 that includes causing the cache to be updated when a ratio of the quantity of the requests serviced from the database to the quantity of the requests serviced from the cache exceeds a predetermined threshold. Such an update to the cache may occur, for example, upon the next alteration to the data entity in the database after the ratio exceeds the threshold. Alternatively, an update to the cache may occur immediately upon the ratio exceeding the threshold. Additionally or alternatively, an update to the cache may occur at a scheduled time. That is, periodically and at regular intervals, the ratio may be examined, and if the ratio exceeds the threshold for some data entities, the cache may be updated as to those data entities, in an embodiment.

In an embodiment, the steps of the method 40 may be repeated on a periodic basis. For example, for a given first time period, respective quantities of read requests serviced from the database and cache may be tracked and stored for a plurality of data entities, as described in conjunction with steps 42, 44, and 46. For each of those entities, during the first time period, a current ratio and/or one or more predicted ratios may be calculated continuously (e.g., for a given data entity, each time a write request for that data entity is received within the first time period, as discussed in conjunction with step 50). If a current or predicted ratio exceeds a selected threshold for a given data entity within the first time period, a publish flag for that data entity may be set so that the data entity is updated in the cache, as discussed in conjunction with step 50. At the end of the first time period, the current ratio for that time period may be stored (for use as a historical period ratio in calculations performed during later time periods), the publish flag may be reset, and the steps of the method may be repeated for a second time period, then a third time period, and so on.

Figure 3:
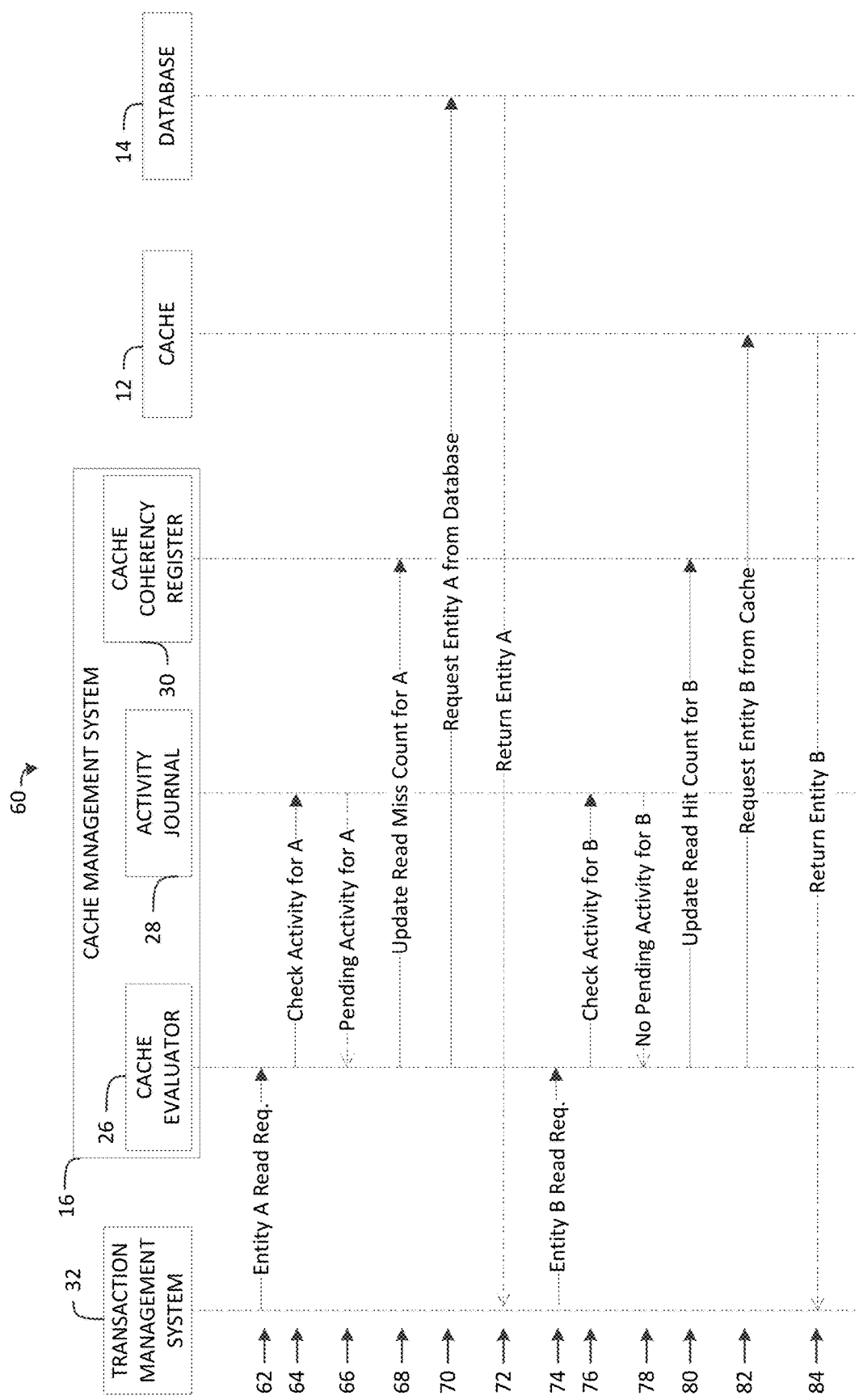
FIG. 3 is a sequence diagram illustrating an example method for servicing database read requests in a system including a database and a database cache.

FIG. 3 is a sequence diagram illustrating an example method 60 for servicing database read requests in a system including a database 14 and a supporting database cache 12. Referring to FIGS. 1 and 3, the method 60 will be described with reference to an embodiment involving the transaction management system 32, the cache evaluator 26, activity journal 28, and cache coherency register 30 of the cache management system 16, the cache 12, and the database 14. Such components are presented for ease of description. In embodiments, the functionality of different components may be combined into a single component, or the functionality of a single component may be implemented in multiple components. For example, in an embodiment, the cache evaluator 26, activity journal 28, and cache coherency register 30 may be implemented in a single system, such as the cache management system 16. Accordingly, although the method of FIG. 3 (and the method of FIG. 4) will include communications and data exchange between and among the cache evaluator 26, activity journal 28, and cache coherency register 30, such communications and data exchange may be processes that a cache management system 16 is configured to perform in conjunction with its own program memory and data memory, in embodiments.

Figure 4:
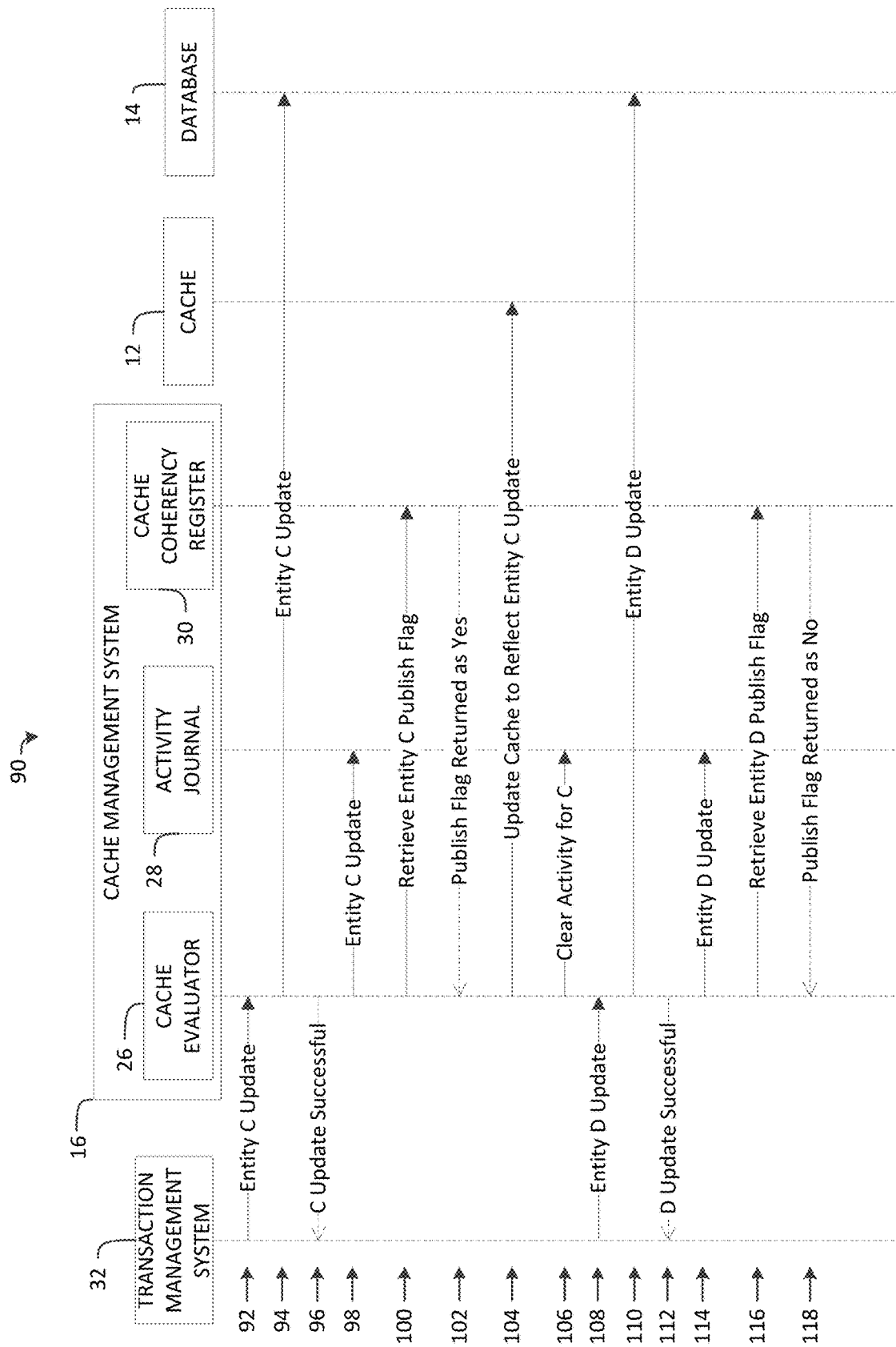
FIG. 4 is a sequence diagram illustrating an example method of updating a database cache to reflect changes to the database.

In conjunction with FIGS. 3 and 4, the activity journal 28 and cache coherency register 30 will be discussed as receiving commands and returning responses. As discussed above with respect to FIG. 1, in embodiments, the activity journal 28 and cache coherency register 30 may be or may include data stored in a computer-readable memory that the cache management system 16 reads from and writes to. It should be understood that the steps of FIGS. 3 and 4 are intended to encompass such embodiments, wherein description below of the activity journal 28 and cache coherency register 30 returning or transmitting some data may be fulfilled by such data being read from memory. The steps of FIGS. 3 and 4 also encompass embodiments in which the activity journal 28 and cache coherency register 30 have independent processing resources, however.

The method 60 may include a step 62 in which the transaction management system 32 transmits a request to the cache evaluator 26 to read a first data entity (data entity A) from the database 14. As noted above with respect to FIG. 1, the request may originate at a request origin and, in another embodiment, may be received by the cache evaluator 26 directly from the request origin.

The method 60 may further include a step 64 in which the cache evaluator 26 transmits a request to check the activity record associated with data entity A in the activity journal 28, and a step 66 in which the activity journal 28 returns a confirmation that there is pending database activity associated with data entity A, where "pending activity" may be a write operation on or revision to data entity A in the database 14 that has not yet been copied over to the cache 12. In steps 64 and 66, the cache management system 16 reads the activity journal 28 with respect to data entity A to determine if the cache 12 has an accurate copy of data entity A. As a result of the pending activity, the cache evaluator may determine that the cache is desynchronized with the database with respect to data entity A, and that the cache does not have a current or accurate version of data entity A.

In some embodiments, as noted above, steps 64 and 66 may include checking the entire data entity for pending activity to determine if the cache 12 has an accurate copy of the entire data entity that is the subject of the read request. In other embodiments, steps 64 and 66 may include checking only the portion of the data entity that is the specific subject of the read request to determine if the cache 12 has an accurate copy of that portion. For example, consider a data entity that has first and second portions, the first portion has pending activity in the activity journal, and the second portion does not have pending activity in the activity. If a read request asks for the first portion, steps 64 and 66 may result in a determination that the data entity has pending activity. In contrast, if the read request asks for the second portion, then steps 64 and 66 may result in a determination that the data entity does not have pending activity.

In response to determining that the cache does not have a current or accurate version of data entity A, then at step 70, the cache evaluator may request data entity A from the database 14 so as to service the read request from the database 14. Further, at step 68, the cache evaluator may update the "miss count" associated with data entity A, i.e., the quantity of read requests for data entity A serviced from the database 14 (because the read "missed" the cache 12), in the cache coherency register 30. For example, the cache evaluator 26 may increment the miss count stored in the cache coherency register 30 for data entity A, or may otherwise store a record of a read request for data entity A serviced from the database 14 in the cache coherency register 30. By recording such "misses," the cache management system 16 may track the quantity of read requests for data entity A that are serviced from the database 14. At step 72, the database 14 may return data entity A to the transaction management system 32 responsive to the read request.

The method 60 may further include a step 74 in which the transaction management system 32 transmits a request to the cache evaluator 26 to read a second data entity (data entity B) from the database 14. As noted above with respect to FIG. 1, the request may originate at a request origin and, in another embodiment, may be received by the cache evaluator 26 directly from the request origin.

The method 60 may further include a step 76 in which the cache evaluator 26 checks the activity record in the activity journal 28 associated with data entity B, and a step 78 in which the activity journal 28 returns a confirmation that there is no pending database activity associated with data entity B. As a result of the lack of pending activity for data entity B, the cache evaluator 26 may determine that the cache 12 is synchronized with the database 14 with respect to data entity B, and that the cache 12 has a current and accurate version of data entity B.

In response to determining that the cache does have a current, accurate version of data entity B, then at step 82, the cache evaluator may request data entity B from the cache 12 so as to service the read request from the cache 12. Further, at step 84, the cache evaluator may update the "hit count" associated with data entity B, i.e., the quantity of read requests for data entity B serviced from the cache 12 (because the read "hit" the cache 12). For example, the cache evaluator 26 may increment the hit count stored in the cache coherency register 30 for data entity B, or may otherwise store a record of a read request for data entity B serviced from the cache 12 in the cache coherency register 30. By recording such "hits," the cache management system 16 may track the quantity of read requests for data entity B that are serviced from the cache. At step 84, the cache 12 may return data entity B to the transaction management system 32 responsive to the read request.

Although the steps of the method 60 are described above with respect to an example in which the "miss count" of data entity A was updated, and the "hit count" of data entity B was updated, it should be understood that the cache management system 16 may track the respective quantities of read requests for a data entity that are serviced from the database or from the cache. That is, the cache management system may track both a "hit count" and a "miss count" for a plurality of data entities stored in the database 14 and in the cache 12. As described above with respect to the method 40 of FIG. 2, and as will be described below with respect to the method of FIG. 4, the hit count and miss count for a given data entity may be used to determine when to update the cache 12 as to that data entity. Furthermore, as discussed above with respect to FIG. 2, the hit count and miss count for a given data entity may be tracked and stored separately for multiple time periods, in an embodiment.

Generally in accordance with the method 60 of FIG. 3, the cache management system 16 may be configured to continuously calculate and monitor a ratio of a quantity of read requests serviced from the database 14 to a quantity of read requests serviced from the cache 12 and/or a predicted future ratio such quantities. Based on a current and/or predicted ratio, the cache management system 16 may set and store an indication of whether the cache should or should not be updated (e.g., in the form of a "publish flag"). The indication may be stored in the cache coherency register 30, in an embodiment.

FIG. 4 is a sequence diagram illustrating an example method 90 of updating a database cache 12 to reflect changes to the database 14.

The method 90 may include a step 92 in which the transaction management system 32 transmits an update for a data entity, data entity C, to the cache evaluator 26. The update may include, for example, an additional value or data type to add to data entity C, a change to a value in data entity C, etc. In an embodiment in which data entity C is an order for goods or services, the update for the data entity may be an additional item, a cancellation of an item, a changed address, etc.

The method 90 may further include a step 94 in which the cache evaluator 26 transmits the update to entity C to the database 14, and in which the database is updated. In step 96, the cache evaluator 26 may transmit a confirmation to the transaction management system 32 to confirm that the update to data entity C was successful.

As a result of the update to data entity C, the database 14 becomes desynchronized with the cache 12 with respect to data entity C. Accordingly, in further steps of the method 90, the cache management system 16 may determine whether or not to update the cache 12 to re-synchronize with the database 14.

At step 98, the cache evaluator may transmit, to the activity journal 28, the substance of the update to data entity C so as to store that activity in the activity journal 28. Additionally or alternatively, the cache evaluator 26 may transmit, to the activity journal 28, an indication that data entity C has been altered (i.e., that there is "pending activity" for data entity C). That is, the cache management system 26 may store the substance of the update to data entity C, which may serve as an indication that data entity C has been altered, in the activity journal 28, and/or the cache management system 26 may store a separate indication that data entity C has been altered that may not include substantive details of the alteration.

As discussed above with respect to the method 60 of FIG. 3, the cache management system 26 may continuously evaluate a ratio of respective quantities of data reads serviced from the database 14 and data reads serviced from the cache 12 and, when the ratio exceeds a threshold, set an indication that the cache 12 should be updated. In the example of data entity C in the method 90 of FIG. 4, the indication (e.g., publish flag) respective of data entity C is set to "Yes," i.e., an indication that data entity C should be updated in the cache 12.

At step 100, the cache evaluator 26 may retrieve, from the cache coherency register 30, a state of a publish flag respective of data entity C and, at step 102, the cache coherency register 30 may return the "Yes" state of the publish flag respective of data entity C. In response to the "Yes" state of the publish flag, at step 104, the cache evaluator 26 may update the cache 12 to reflect the update to data entity C. As a result of the update at step 104, the cache 12 may be resynchronized with the database 14 with respect to data entity C.

The method 90 may further include step 106, in which the cache evaluator 26 clears the activity journal 28 with respect to data entity C. As a result of step 106, the activity journal 28 with respect to data entity C may be empty. Thus, the activity journal 28 may include records of activity for a data entity that has occurred since the cache 12 was last updated with respect to that data entity.

The method 90 may further include steps respective of another data entity, data entity D. At step 108, the transaction management system 32 may transmit an update for data entity D to the cache evaluator 26. The update may include, for example, an additional value or data type to add to data entity D, a change to a value in data entity D, etc. In an embodiment in which data entity D is an order for goods or services, the update for the data entity may be an additional item, a cancellation of an item, a changed address, etc.

The method 90 may further include a step 110 in which the cache evaluator 26 transmits the update to entity D to the database 14, and in which the database 14 is updated. In step 112, the cache evaluator 26 may transmit a confirmation to the transaction management system 32 to confirm that the update to data entity D was successful.

As a result of the update to data entity D, the database 14 becomes desynchronized with the cache 12 with respect to data entity D. Accordingly, in additional steps, the cache management system 16 may determine whether or not to update the cache 12.

At step 114, the cache evaluator 26 may transmit, to the activity journal 28, the substance of the update to data entity D. Additionally or alternatively, the cache evaluator 26 may transmit, to the activity journal 28, an indication that data entity D has been altered (i.e., that there is "pending activity" for data entity D). That is, the cache management system 16 may store the substance of the update to data entity D, which may serve as an indication that data entity D has been altered, in the activity journal 28, and/or the cache management system 16 may store a separate indication that data entity D has been altered that may not include substantive details of the alteration.

As discussed above with respect to the method 60 of FIG. 3, the cache management system 16 may continuously evaluate a ratio of quantities of data reads serviced from the database and from the cache and, when the ratio exceeds a threshold, set an indication that the cache should be updated. In the example of data entity D in the method 90 of FIG. 4, the indication (e.g., publish flag) respective of data entity D is set to "No," i.e., an indication that data entity D should not be updated in the cache 12. Accordingly, the method 90 of FIG. 4 does not include an update to data entity D in the cache 12.

As noted above with respect to the method 40 of FIG. 2, ratios of respective quantities of data read requests serviced by the database and the cache may be continuously calculated within a given time period, and may be stored at the end of a time period for use as historical data in later time periods, in an embodiment. Furthermore, at the beginning or end of a given time period, the publish flag for a given data entity may be reset, in an embodiment.

Figure 5:
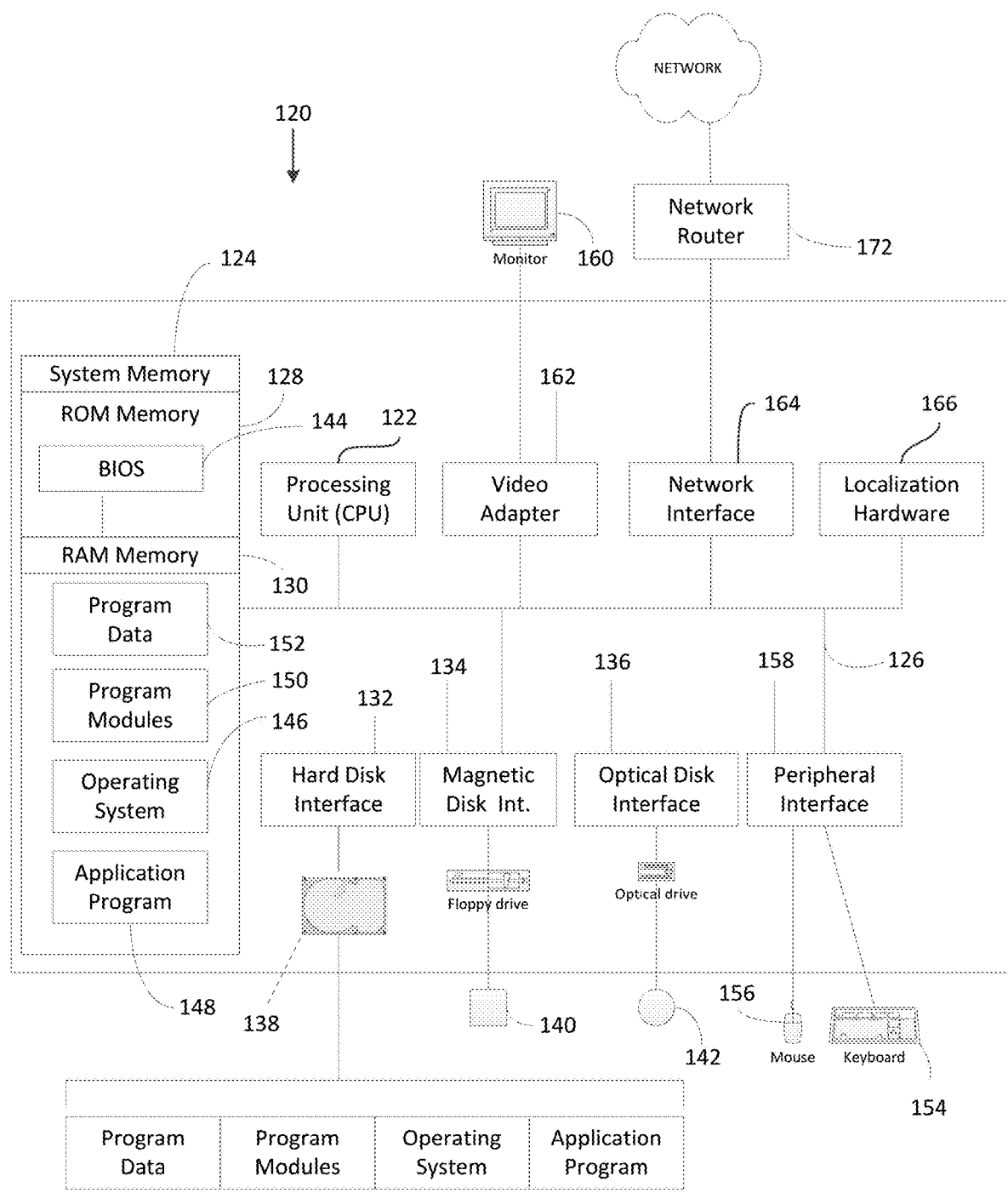
FIG. 5 is a diagrammatic view of an illustrative computing system that includes a general purpose computing system environment that may find use in various aspects of the system of FIG. 1.

FIG. 5 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as the search engine and/or search parameter weight tuning processes disclosed herein), other program modules 150, and/or program data 152. Still further, computer-executable instructions may be downloaded to the computing environment 120 as needed, for example, via a network connection.

An end-user may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 126 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 164. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 166 for determining a location of the computing system environment 120. In embodiments, the localization hardware 166 may include, for example only, a GPS antenna, an RFID chip or reader, a WiFi antenna, or other computing hardware that may be used to capture or transmit signals that may be used to determine the location of the computing system environment 120.

The computing environment 120, or portions thereof, may comprise one or more of the request origins 18 of FIG. 1, in embodiments. Additionally, or alternatively, some or all of the components of the computing environment 120 may comprise embodiments of the cache management system 16 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method for operating a database and a cache of at least a portion of the database, the method comprising:
   receiving a plurality of read requests to read a data entity from the database;
   determining whether each of the plurality of read requests was serviced from the database or from the cache;
   counting a quantity of the requests serviced from the database and a quantity of the requests serviced from the cache;
   receiving a write request to alter the data entity in the database; and
   determining whether to update the cache to reflect the alteration to the data entity in the write request according to the quantity of the requests serviced from the database and the quantity of the requests serviced from the cache;
   wherein counting the quantity of the requests serviced from the database and the quantity of the requests serviced from the cache is performed over two or more periods of time, wherein the method further comprises:
   computing, for each of the periods of time, a respective ratio of the quantity of the requests serviced from the database to the quantity of the requests serviced from the cache within that period of time;
wherein determining whether to update the cache to reflect the write request is according to the respective ratios for the two or more periods of time.

2. The method of claim 1, wherein the method further comprises:
causing the cache to be updated when a ratio of the quantity of the requests serviced from the database to the quantity of the requests serviced from the cache exceeds a predetermined threshold.

3. The method of claim 1, wherein determining whether to update the cache to reflect the write request according to the quantity of the requests serviced from the database and the quantity of the requests serviced from the cache comprises:
applying a predictive algorithm to the quantity of the requests serviced from the database and the quantity of the requests serviced from the cache that calculates a likelihood that a future read request will be serviced from the database.

4. The method of claim 3, wherein the predictive algorithm comprises a regression analysis.

5. The method of claim 3, wherein the method further comprises:
causing the cache to be updated when the likelihood that the future read request will be serviced from the database exceeds a predetermined threshold.

6. A system for operating a database and a cache of at least a portion of the database, the system comprising:
a cache management system configured to be in electronic communication with the database and with the cache, the cache management system comprising a processor and a computer-readable memory storing instructions that, when executed by the processor, cause the cache management system to:
receive a plurality of read requests to read a data entity from the database;
determine whether each of the plurality of read requests was serviced from the database or from the cache;
count a quantity of the requests serviced from the database and a quantity of the requests serviced from the cache;
receive a write request to alter the data entity in the database; and
determine whether to update the cache to reflect the alteration to the data entity in the write request according to the quantity of the requests serviced from the database and the quantity of the requests serviced from the cache;
wherein counting the quantity of the requests serviced from the database and the quantity of the requests serviced from the cache is performed over two or more periods of time, wherein the memory stores further instructions that, when executed by the processor, cause the cache management system to:
compute, for each of the periods of time, a respective ratio of the quantity of the requests serviced from the database to the quantity of the requests serviced from the cache within that period of time;
wherein determining whether to update the cache to reflect the write request is according to the respective ratios for the two or more periods of time.

7. The system of claim 6, further comprising the database.

8. The system of claim 6, further comprising the cache.

9. The system of claim 6, wherein the instructions, when executed by the processor, further cause the cache management system to:
cause the cache to be updated when a ratio of the quantity of the requests serviced from the database to the quantity of the requests serviced from the cache exceeds a predetermined threshold.

10. The system of claim 6, wherein determining whether to update the cache to reflect the write request according to the quantity of the requests serviced from the database and the quantity of the requests serviced from the cache comprises:
applying a predictive algorithm to the quantity of the requests serviced from the database and the quantity of the requests serviced from the cache that calculates a likelihood that a future read request will be serviced from the database.

11. The system of claim 10, wherein the predictive algorithm comprises a regression analysis.

12. The system of claim 10, wherein the instructions, when executed by the processor, further cause the cache management system to:
cause the cache to be updated when the likelihood that the future read request will be serviced from the database exceeds a predetermined threshold.

13. The system of claim 6, wherein determining whether to update the cache to reflect the write request according to the quantity of the requests serviced from the database and the quantity of the requests serviced from the cache comprises determining whether to update the cache to reflect the write request according to the quantity of the requests serviced from the database on two or more specified days in the past and the quantity of the requests serviced from the cache on the two or more specified days in the past.

14. A system for operating a database, the system comprising:
a cache of at least a portion of the database; and
a cache management system configured to be in electronic communication with the database and with the cache, the cache management system comprising a processor and a computer-readable memory storing instructions that, when executed by the processor, cause the cache management system to:
receive a plurality of read requests to read a data entity from the database;
for each of the plurality of read requests:
determine if the cache has an accurate copy of the data entity;
responsive to determining that the cache has an accurate copy of the data entity, service the request from the cache; and
responsive to not determining that the cache has an accurate copy of the data entity, service the request from the database;
count a quantity of the requests serviced from the database and a quantity of the requests serviced from the cache;
receive a write request to alter the data entity in the database; and
determine whether to update the cache to reflect the alteration to the data entity in the write request according to the quantity of the requests serviced from the database and the quantity of the requests serviced from the cache;
wherein counting the quantity of the requests serviced from the database and the quantity of the requests serviced from the cache is performed over two or more periods of time, wherein the memory stores further instructions that, when executed by the processor, cause the cache management system to:

compute, for each of the periods of time, a respective ratio of the quantity of the requests serviced from the database to the quantity of the requests serviced from the cache within that period of time;

wherein determining whether to update the cache to reflect the write request is according to the respective ratios for the two or more periods of time.

15. The system of claim 14, further comprising the database.

16. The system of claim 14, wherein determining whether to update the cache to reflect the write request according to the quantity of the requests serviced from the database and the quantity of the requests serviced from the cache comprises:

applying a predictive algorithm to the quantity of the requests serviced from the database and the quantity of the requests serviced from the cache that calculates a likelihood that a future read request will be serviced from the database.

17. The system of claim 16, wherein the instructions, when executed by the processor, further cause the cache management system to:

update the cache when the likelihood that the future read request will be serviced from the database exceeds a predetermined threshold.

18. The system of claim 16, wherein the instructions, when executed by the processor, further cause the cache management system to:

update the cache when a ratio of the quantity of the requests serviced from the database to the quantity of the requests serviced from the cache exceeds a predetermined threshold.

* * * * *